United States Patent [19]

Van Nordstrand

[11] 4,266,672

[45] May 12, 1981

[54] CATALYTIC CRACKING WITH SEPIOLITE

[75] Inventor: Robert A. Van Nordstrand, San Rafael, Calif.

[73] Assignee: Chevron Research Company, San Francisco, Calif.

[21] Appl. No.: 78,853

[22] Filed: Sep. 26, 1979

[51] Int. Cl.$^3$ .................. C10G 11/02; C10G 11/05
[52] U.S. Cl. .................................. 208/120; 208/119; 252/455 Z; 252/477 R
[58] Field of Search ............... 208/120, 119, 109, 111; 252/477 R

[56] References Cited

U.S. PATENT DOCUMENTS

| | | | |
|---|---|---|---|
| 3,210,267 | 10/1965 | Plank et al. | 208/120 |
| 3,258,431 | 6/1966 | Fisher et al. | 208/255 X |
| 3,271,418 | 9/1966 | Plank et al. | 208/120 |
| 4,152,250 | 5/1979 | Inooka et al. | 208/251 H |
| 4,166,026 | 8/1979 | Fukui et al. | 208/210 |
| 4,191,636 | 3/1980 | Fukui et al. | 208/109 |
| 4,196,102 | 4/1980 | Inooka et al. | 252/457 |

Primary Examiner—Delbert E. Gantz
Assistant Examiner—G. E. Schmitkons
Attorney, Agent, or Firm—D. A. Newell; W. D. Reese; C. L. Hartman

[57] ABSTRACT

A process is disclosed for cracking hydrocarbons by contacting the hydrocarbons with a catalyst composition comprising dispersed rods of fibrous form sepiolite and an inorganic oxide gel for binding the sepiolite rods.

8 Claims, No Drawings

CATALYTIC CRACKING WITH SEPIOLITE

BACKGROUND OF THE INVENTION

The present invention concerns a process for catalytic cracking of hydrocarbons using a sepiolite-containing catalyst which has both a large pore system and good attrition resistance.

Catalytic cracking systems employ catalyst in a moving bed or a fluidized bed. Catalytic cracking is carried out in the absence of externally supplied molecular hydrogen, and is, for that reason, distinctly different from hydrocracking, in which molecular hydrogen is added in processing. In catalytic cracking, an inventory of particulate catalyst is continuously cycled between a cracking reactor and a catalyst regenerator. In a fluidized catalytic cracking (FCC) system, a stream of hydrocarbon feed is contacted with fluidized catalyst particles in a hydrocarbon cracking zone, or reactor, at a temperature of about 425°–600° C., usually 460°–560° C. The reactions of hydrocarbons at the hydrocarbon stream at the elevated operating temperature result in deposition of carbonaceous coke on the catalyst particles. The resulting fluid products are separated from the coke-deactivated, spent catalyst and are withdrawn from the reactor. The coked catalyst particles are stripped of volatiles, usually by means of steam, and passed to the catalyst regeneration zone. In the catalyst regenerator the coked catalyst is contacted with a predetermined amount of molecular oxygen. A desired portion of the coke is burned off the catalyst, restoring catalyst activity and simultaneously heating the catalyst to, e.g. 540°–815° C., usually 590°–730° C. Flue gas formed by combustion of coke in the catalyst regenerator may be treated for removal of particulates and conversion of carbon monoxide, after which it is normally discharged into the atmosphere.

Sepiolite is a naturally occurring clay-type mineral, which often has a lath-shaped or fibrous morphology. It is a hydrated magnesium silicate, also known as meershaum. Discussions of sepiolite are found in the books Clay Mineralogy, by R. E. Grim, published by McGraw-Hill (2d Ed., 1968), and The Electron-Optical Investigation of Clays, J. A. Gard, Ed., puyblished by the Mineralogical Society (Great Britain, 1971). Sepiolite can be formed synthetically by known techniques. Although sepiolite can occur in forms other than laths, rods or fibers, only the lathe-type sepiolite is suitable for use in providing the essential sepiolite rods used in the catalyst of the invention, as discussed below.

The use of faujasite type zeolites in catalytic cracking is well known. The use of crystalline aluminosilicate zeolites having uniform pore openings in the range from 5.5–7.0 Angstroms and maximum cage dimensions of 5.5–7.0 Angstroms for catalytic cracking is also known. For example, U.S. Pat. Nos. 3,758,403, 3,849,029 and 3,856,659 all suggest the use of the zeolite ZSM-5 in a dual-zeolite catalyst, along with a conventional crystalline aluminosilicate having larger pore openings and cages, such as a Y-type zeolite. U.S. Pat. No. 3,894,934 suggests the use of a carbon monoxide combustion-promoting component in conjunction with ZSM-5 and a large-pore-size crystalline aluminosilicate. The use of ZSM-5 containing active catalytic metal values to catalyze aromatics alkylation is suggested in U.S. Pat. No. 3,953,366. ZSM-5-containing catalysts are also discussed in U.S. Pat. Nos. 3,702,886 and 3,926,782. Crystalline silicates are described in U.S. Pat. Nos. 4,061,724 and 4,073,865.

SUMMARY OF THE INVENTION

In an embodiment, the present invention concerns a process for cracking a hydrocarbon feed in the absence of added molecular hydrogen, which comprises contacting the feed, at catalytic cracking conditions, with a catalyst composition comprising shaped catalytic bodies including (1) dispersed rods of fibrous form sepiolite, (2) at least one porous refractory inorganic oxide gel, the gel bonding the sepiolite rods together in a rigid, substantially random mutual orientation in the catalytic bodies. An acidic zeolite component is also preferably included especially when the gel is not actively acidic.

I have found that a shaped catalyst for catalytically cracking high metals hydrocarbon feeds, possessing surprisingly high attrition resistance, and having an advantageously high proportion of its total pore volume in 200-1000 Angstrom macropores for superior demetalation, can be provided by employing dispersed rods of lath-type, fibrous sepiolite as a matrix, skeleton or framework in the catalyst particles. The sepiolite laths or rods are bonded together, using a suitable refractory inorganic oxide gel, such as silica or alumina, in random orientation to form the rigid, three-dimensional matrix. Shrinkage and deformation of the microporous gel binder during drying of the catalyst particles provides a large fraction of 200-1000 Angstrom macropores in the catalyst, while the rigid framework of sepiolite rods provides the catalyst bodies with excellent attrition resistance. The catalyst provides excellent catalytic cracking and demetalation, especially with petroleum residua and other normally refractory feeds.

DETAILED DESCRIPTION OF THE INVENTION

The present invention is preferably used in a system for catalytic cracking of hydrocarbon feeds. Conventional catalytic cracking feeds typically include a mixture of aliphatic and aromatic hydrocarbons boiling above about 221° C. The same hydrocarbon cracking feeds normally processed in commercial catalytic cracking systems may be processed in a cracking system employing the present invention. Suitable feedstocks include, for example, petroleum distillates or residuals, either virgin or partially refined, e.g. by catalytic hydroprocessing. Thus, conventional gas oil cuts are suitable, as are atmospheric and vacuum residua. So-called synthetic feeds, such as coal oils, bitumen and shale oils, are also suitable. Suitable feedstocks normally boil in the range from about 221°–600° C. or higher. A suitable feed may include recycled hydrocarbons which have already been subjected to cracking, for example light, medium and heavy cycle oils. Preferred feeds are the heavier stocks, such as residua, which are relatively refractory to treatment and include substantial concentrations of metals and/or asphaltenes (heptane-insoluble material).

Conversion, or cracking, conditions employed in the hydrocarbon conversion step of the invention may be obtained in part by pre-heating or heat-exchanging the hydrocarbon feed to bring it to a temperature of about 315°–400° C. before introducing it into the cracking zone, but preheating of the feed is not essential. Cracking, conversion conditions include a temperature of about 425° C. to about 600° C., preferably 460° C. to 560° C. Cracking conditions also include a pressure in the range from about atmospheric to about 4 atmospheres or more, preferably about 2 atmospheres to about 3 atmospheres. In fluidized catalyst systems, a catalyst-hydrocarbon weight ratio of about 3 to about 10 is usually suitable. A hydrocarbon weight hourly space velocity in the cracking zone of about 5–250 per hour is preferably used. The average amount of coke contained in the so-called "spent" catalyst after contact with the hydrocarbons in the cracking zone, when the catalyst is passed to the regenerator, is preferably between about 0.5 weight percent and about 2.5 weight percent. The exact coke concentration on spent catalyst will depend partly on the desired carbon content of regenerated catalyst in the particular system, as well as on the heat balance of the particular system. The cracking, or reaction, zone may be of conventional design and may use dilute-phase fluidized catalyst contact, riser-type entrained catalyst contact, dense-bed fluidized catalyst contact, countercurrent contact, or a combination thereof, between the feed hydrocarbons and the catalyst. Catalyst fluidization and entrainment may be assisted by use of gases such as steam or nitrogen.

The catalyst regeneration zone used in an embodiment of the present invention may also be of conventional design suitable for use in regenerating cracking catalyst. The gaseous atmosphere within the conventional cracking catalyst regeneration zone normally includes a mixture of gases in concentrations which vary according to the locus within the regenerator. The concentrations of gases also vary according to the coke concentration on the spent catalyst particles entering the regenerator and according to the amount of molecular oxygen and steam introduced into the regenerator. Generally, the gaseous atmosphere in the regenerator contains 5–25% steam, varying amounts of oxygen, carbon monoxide, carbon dioxide and nitrogen. A temperature in the regeneration zone of about 538° C. to about 815° C. is generally suitable, and a temperature of about 600° C. to about 700° C. is preferred. Regeneration is preferably carried out in a dense-phase fluidized bed of catalyst, with "dense-phase" being defined as a density of at least 160 kg/m$^3$.

The catalyst composition employed in the present invention includes two essential components: (1) dispersed rods of lath-type, fibrous sepiolite, and (2) an inorganic oxide gel for bonding the rods, and preferably includes an acidic cracking component, which may be supplied at least in part by the inorganic oxide gel, but is advantageously supplied by a zeolite.

The fibrous or lath-type form of sepiolite is readily available in natural deposits. In its natural state sepiolite often comprises bundles of lath-shaped rods, fibers or needles consolidated or bonded together weakly in parallel orientation. In order to make the sepiolite suitable for use in the present catalyst, bundles of parallel, consolidated rods must be broken up, so that the sepiolite rods are unconnected, or dispersed. As used herein, the term "dispersed rods", means sepiolite rods, or lath-shaped crystals, which have been substantially completely disassociated from other rods, so that each sepiolite rod is freely movable with respect to other rods. Dispersal of the rods can be accomplished, when necessary, by grinding, milling, kneading and the like. It is strongly preferred that dispersal is carried out in the presence of an aqueous hydrogel or sol precursor of the inorganic oxide gel component, with the sepiolite being worked as a slurry. For example, a colloid mill can be used satisfactorily in many cases to disassociate the individual rods. Dispersion is facilitated by mechanical agitation of the sepiolite in an aqueous medium. A dispersion procedure can conveniently be carried out in the presence of an aqueous precursor of the inorganic oxide gel component, as by milling a slurry of fibrous sepiolite in the presence of an inorganic oxide precursor sol.

Preferably, the sepiolite rods used in the catalyst have a length to diameter ratio of about 5:1 to about 100:1. The rod diameter, for this purpose, is taken as the largest diameter of the rod normal to the length. If the average length:diameter ratio of available rods is higher than desired, it can be decreased by grinding the sepiolite to a finer particle size.

The length of sepiolite rods used in a catalyst is also preferably maintained within a range proportionate to the size of the catalytic bodies, or particles, to be formed from the sepiolite and inorganic oxide. If the length of the rods is too great in comparison to the average diameter of the catalyst bodies to be formed, then the shaping procedure can tend to cause a uniform, parallel mutual orientation of the sepiolite rods in the shaped catalyst. This is particularly the case when extrusion is used for shaping, but is not so critical in shaping by spray drying. Preferably, the average length of the sepiolite rods used is between about 2% to about 10% of the average diameter of the shaped catalytic bodies into which the catalyst is formed. Rods shorter than 2% of the catalyst particle diameter are usually quite satisfactory, but rods larger than 10% are usually not satisfactory.

In addition to the sepiolite component of the present catalyst, a porous, refractory inorganic oxide gel component is also essential. Suitable refractory inorganic oxide gels are well known to those skilled in the art. Examples of suitable inorganic oxides are silica, alumina, magnesia, zirconia, titania, boria, and the like. Mixtures of two or more inorganic oxides are also suitable. Preferred inorganic oxides are silica, alumina and silica-alumina. The gel material preferably has a substantial fraction of its total pore volume in micropores having more diameters in the range from 1 to 200 Angstrom units. The inorganic oxide gel may be provided or derived from a natural material such as a clay or may be a synthetic material such as synthetic silica-alumina cogel. Suitable additional materials which may be used in the catalyst include kaolin clays, bentonite clays, the type of layered clays discussed in U.S. Pat. Nos. 3,252,757, 3,252,889 and 3,743,594, montmorillinite clays, etc. If the gel has a suitable acidity and cracking activity, it can be used to provide all, or part of the acidic cracking function of the catalyst.

The dispersed sepiolite rods and the inorganic oxide gel may be combined in any suitable conventional manner. For example, the rods may be added to an aqueous solution of a precursor of the inorganic oxide, after which a hydrogel of the inorganic oxide is formed, and the resulting mass is then shaped and dried conventionally. Or, the sepiolite component can be added to a previously precipitated hydrogel which has not hardened, and the rods and gel can be mechanically mixed prior to shaping. Another suitable combination technique is to combine the rods with a properly peptized powder of an inorganic oxide, again with mechanical mixing to homogenize the resulting mass.

Preferably, the amount of the inorganic oxide component is about 10 weight percent to about 50 weight percent of the amount of the sepiolite rods in the final catalyst composition.

An essential function of the inorganic oxide gel component is to act as a bonding agent for holding or bonding the sepiolite rods in a rigid, three-dimensional matrix or skeletal arrangement. The inorganic oxide provides a rigid link between the sepiolite rods, which are randomly oriented in a three-dimensional mutual orientation. The resulting rigid skeletal framework provides a catalyst body with high crush strength and attrition resistance.

After a mass of mixed sepiolite and inorganic oxide gel, e.g. as a hydrogel, or other gel precursor has been shaped into the desired form, as by spray drying in the case of fluidized cracking or by extruding, pilling, hot oil sphere formation or like conventional technique, in the case of moving bed cracking, the resulting catalytic bodies may be dried and/or calcined in a conventional manner, if desired. This is not normally required when spray drying is used for shaping, and spray drying is a preferred shaping technique.

When conventional catalyst bases, such as inorganic oxide gels, are heated during drying and/or calcination, the microporous inorganic oxide component tends to shrink, resulting in a catalyst which is structurally stable, but which has few pores with diameters greater than 200 Angstrom units. The presence of the sepiolite rod framework, or matrix, in the present catalyst prevents such uniform shrinkage of the gel component. The result is a catalyst with a large fraction of its pore volume provided by pores with diameters in the range from 200 Angstroms to 1,000 Angstroms. Preferably, the relative proportions of the sepiolite and inorganic oxide gel components in the catalyst (and the proportion of any zeolites included) are adjusted so that the final catalyst bodies have at least 40% of their total pore volume supplied by pores with diameters between 200 and 1,000 Angstroms. Pore size distribution and pore volume may be determined by the mercury porosimitry method, as described in U.S. Pat. No. 3,853,789, or, if appropriate, by the BET nitrogen adsorption method described in JACS 60, 309 (1939) and 73, 373 (1951). Pores in the 200–1000 Angstrom range are particularly suitable when the present catalyst is employed in catalytic cracking of hydrocarbons containing a substantial concentration of asphaltenes and metals. The total surface area of the present catalysts is not particularly critical for most uses; however, a surface area between about 10 and 200 square meters per gram is preferred. The present catalyst may optionally include at least one acidic, zeolitic crystalline aluminosilicate component. An acidic zeolite component is necessary when the acidic, cracking function is not supplied by the inorganic oxide gel. The zeolitic crystalline aluminosilicates include aluminum and silicon atoms, each of which is associated with four oxygen atoms, which may be shared with other aluminum and silicon atoms to form larger crystalline structures. The four oxygen atoms define a tetrahedron around an aluminum or silicon atom, with the aluminum and silicon atoms being at the centers of tetrahedra. The tetrahedra of these crystalline solids combine to form crystals with a structure of uniform pores, openings and cages or channels which are of molecular dimensions. The pore openings, or apertures, of crystalline aluminosilicates are conventionally described as being defined by "sides" of a certain number of tetrahedra. Crystalline materials with pore openings in the intermediate range are usually characterized as having ten-sided apertures, while small-pore zeolites, such as Zeolite A, usually have eight-sided apertures, and large-pore zeolites, such as Zeolites X and Y, usually have twelve-sided apertures. The pores of zeolites conventionally used in cracking catalyst, such as Zeolite Y, are large enough to admit most of the molecules in a hydrocarbon feed. Intermediate-size pore openings of 5.5–7.0 Angstrom units are large enough to permit paraffins and like relatively small-diameter molecules to enter relatively easily the cages in the crystalline solids, but are small enough to inhibit entry of large effective-diameter molecules, such as dicyclics, into the cages of the crystals. One type of zeolite, which can be employed in the catalyst, is one having large-size pores of the faujasite type. Another suitable type of zeolite is one having substantially uniform cages of "intermediate" maximum diameter, i.e. from 5.5–7.0 Angstrom units. In some cases, the crystal structure defines long channels, rather than cages. In this case, the relevant maximum dimension of the "intermediate" zeolite is that of the maximum diameter of the cross-sections of the channels. The 5.5- to 7.0-Angstrom-diameter cages of such zeolites permit the dehydrogenation of paraffins to occur, but impede formation of large coke-forming molecules within the intermediate-size cages. This may be contrasted to the more conventional cracking reactions which can take place in larger-size cages present in crystalline aluminosilicates in cracking catalysts such as hydrogen-form or rare earth-form Zeolite Y.

Suitable intermediate-pore zeolites include, for example, zeolites having the characteristic crystal structures of Zeolite ZSM-5, small-pore mordenite, Zeolite NU-1 and the like. Such zeolites may be used as synthesized or may be modified by known techniques such as ion exchange, acid leaching and the like to vary their porosity, acid strength and total acidity, their catalytic hydrogen exchange and hydrogen transfer characteristics, and the ratio of their key atomic constituents. The products obtained in the present process will vary depending on the characteristics of the particular crystalline solid employed. A lower silica/alumina ratio ZSM-5-type zeolite will tend to form a relatively aromatic product. Zeolites having a ZSM-5-type crystal structure are one preferred type of zeolite for use in the present catalyst. Zeolites in this category include, for example, in addition to ZSM-5 such other zeolites as ZSM-8 (see Netherlands Patent Publication No. 7,014,807 and U.S. Pat. No. 3,758,403), ZSM-11 (see U.S. Pat. Nos. 3,709,979 and 3,804,746), ZSM-35 (see U.S. Pat. Nos. 3,962,364, 3,965,210, 3,992,466 and 4,016,245). Also suitable are the zeolite NU-1 (see U.S. Pat. No. 4,061,724) and "Silicalite", a crystalline silicate discussed in Nature, Volume 271, page 512 (Feb. 9, 1978) (also see U.S. Pat. Nos. 4,061,724 and 4,073,865).

Preferably, in manufacturing the catalyst, the sepiolite rods, optional acidic zeolite, and inorganic oxide binder precursor are all mixed. Preferably, the catalyst particles contain 0.01–30 weight percent of at least one acidic, zeolitic crystalline aluminosilicate. A large-pore-size zeolite is preferably used in a concentration of 5–15 weight percent of the catalyst. An intermediate pore-size zeolite is preferably used in an amount of 0.01 to 5 weight percent.

If a 5.5–7.0 Angstrom pore-size zeolite to be used in the catalyst possesses cationic ion-exchange properties, stabilizing cations may be exchanged in the crystal structure to replace the synthesis cations. Preferred cations include, for example, rare earth metal cations, protons or proton precursors such as ammonium, etc. If a large-pore or large-cage crystalline aluminosilicate, such as an X or Y type zeolite, is incorporated in the catalyst particles, then cationic ion-exchange sites in the larger pore zeolite are preferably also occupied by conventionally used activating or stabilizing cations such as rare earths, protons or proton precursors.

The sepiolite-containing catalyst particles can be used advantageously in any of several optional modes in cracking systems. In one mode, a single catalyst composition can be used as the sole catalytic agent in the particulate solids inventory circulating in the cracking system. In such embodiments it is preferred that the catalyst composition include both the sepiolite rods, an intermediate pore-size zeolite and a larger-pore, acidic crystalline aluminosilicate component such as X or Y type zeolites.

In another optional mode of use, the sepiolite-containing catalyst particles can be circulated in a cracking system in physical mixture with other particulate solids. The other solids may be, for example, conventional acidic, zeolite-containing, particulate cracking catalysts, or non-zeolitic, crystalline or amorphous particulate cracking catalysts such as acidic silica-alumina co-gels, clays, etc. Other suitable particulate solids include alumina, or alumina-containing particles which can be used in a cracking system for sulfur oxides control in the catalyst regenerator, as disclosed in U.S. Pat. Nos. 4,071,436 and 4,115,249-251 and combustion promoting additives, e.g. platinum-containing particles, to aid in catalyst regeneration.

Alumina may also serve as, or be incorporated within, a binder associated with the sepiolite rods.

The following Illustrative Embodiments describe preferred embodiments of the preparation of the present catalyst and its use in catcalytic cracking of a heavy hydrocarbon feed.

ILLUSTRATIVE EMBODIMENT I

Naturally occurring sepiolite is obtained and crushed in dry form to one-half inch diameter particles. The particles are slurried in water at a water:sepiolite volume ratio of 9:1 and subjected to further comminution in conventional clay handling apparatus, such as a blunger, to provide sepiolite particles of less than 5 micron diameter. Silt and sand particles larger than 5 microns are settled out of the dispersion. The sepiolite is then concentrated by filtration to provide a wet filter cake. An alumina hydrogel slurry is prepared conventionally, as by peptizing a commercially available boehmite alumina (e.g. Catapal) by violent agitation with a peptizing agent such as nitric acid or formic acid. The hydrogel may also be prepared by precipitation from an aqueous solution of alumina nitrate by addition of a base such as ammonium hydroxide. After appropriate washing to remove undesired ions, the hydrogel is mixed with sufficient water to provide 15 weight percent alumina in a slurry. A mixture of sepiolite and alumina hydrogel is then formed by adding the filter cake to the hydrogel slurry at a sepiolite:alumina weight ratio of 3:1. 15 weight percent (based on combined total solids) of conventional rare earth-exchanged type Y crystalline aluminosilicate and 0.1 weight percent of ZSM-5 are then added to the mixture. The rods of sepiolite are then dispersed, randomly oriented and homogeneously mixed with the alumina and zeolites. Proper blending of the components is important in order to obtain the advantageous physical properties desired in the final catalyst. A preferred blending-dispersing procedure is, first, to agitate the sepiolite-zeolite-alumina mixture violently in a Waring blender, Cowles dissolver, or the like, for about 20 minutes. At this stage the solids should be in slurry form in water with about 25 weight percent solids. Proper dispersal of the sepiolite rods is indicated by a slurry viscosity of above that of water. The sepiolite rods in the slurry are then further dispersed by passing the slurry two or three times through a stone colloid mill, e.g., a Morehouse mill, or the like. Clearance of the mill should be adjusted to provide a temperature rise of 6°–10° C. during each pass, indicating sufficient shear for proper dispersion of the sepiolite rods in the mixture. The mixture is then spray-dried in a conventional manner to provide a particulate catalytic cracking catalyst of 50–75 microns average diameter.

ILLUSTRATIVE EMBODIMENT II

Cracking tests are carried out in a conventional FCC unit using a combination of riser and bed-type cracking. The catalyst prepared in ILLUSTRATIVE EMBODIMENT I is employed. A 325°–525° C. boiling-range gas oil feed is employed. A cracking temperature of 500° C. and a catalyst/oil ratio of 7 are used. Spent catalyst passed to the regenerator contains 0.8 weight percent coke. The spent catalyst is regenerated at a temperature of 650° C. The regenerated catalyst has a carbon concentration of about 0.08 weight percent. A total feed conversion of about 70 weight percent is obtained.

What is claimed is:

1. A process for cracking a hydrocarbon feed in the adsence of added molecular hydrogen, which comprises:
   contacting said feed, at catalytic cracking conditions, with a catalyst composition comprising shaped catalytic bodies including (1) dispersed rods of fibrous form sepiolite, and (2) at least one porous refractory inorganic oxide gel, said gel bonding said sepiolite rods together in a rigid substantially random mutual orientation in said catalytic bodies.

2. A process as defined in claim 1 wherein said inorganic oxide gel is present in said composition in an amount between 10 and 50 weight percent of said rods.

3. A process as defined in claim 1 wherein the average diameter of said rods is between 2% and 10% of the average diameter of said shaped catalytic bodies.

4. A process as defined in claim 1 wherein at least 40 weight percent of the total pore volume in said catalytic bodies is provided by pores with diameters between about 200 Angstrom units and 1000 Angstrom units.

5. A process as defined in claim 1 wherein said rods have an average length:diameter ratio between about 5:1 and 100:1, where the diameter is the maximum diameter of said rods.

6. A process as defined in claim 1 wherein said catalytic bodies further include from 0.01 to 30 weight percent of at least one zeolitic crystalline aluminosilicate.

7. A process as defined in claim 6 wherein said catalytic bodies include from 5 to 15 weight percent of a Y-type zeolitic crystalline aluminosilicate.

8. A process as defined in claim 6 wherein said catalytic bodies include from 0.01 to 5 weight percent of a ZSM-5-type zeolitic crystalline aluminosilicate.

* * * * *

UNITED STATES PATENT AND TRADEMARK OFFICE
CERTIFICATE OF CORRECTION

PATENT NO. : 4,266,672
DATED : May 12, 1981
INVENTOR(S) : Robert A. Van Nordstrand It is certified that error appears in the above-identified patent and that said Letters Patent are hereby corrected as shown below:

Col. 4, line 44, "more diameters" should read --pore diameters--

In the claims:

Col. 8, line 35, "adsence" should read --absence--

Signed and Sealed this

Twenty-eighth Day of July 1981

[SEAL]

Attest:

GERALD J. MOSSINGHOFF

*Attesting Officer*   *Commissioner of Patents and Trademarks*